3,776,931
COPPER-CONTAINING COMPOUNDS
Derek Bryce-Smith, Highland Wood House, Mill Lane, and Ernest Thomson Blues, 36 Reeds Ave., both of Reading, England
No Drawing. Filed Jan. 12, 1971, Ser. No. 105,960
Claims priority, application Great Britain, Jan. 13, 1970, 1,663/70
Int. Cl. C07f 1/08
U.S. Cl. 260—438.1            40 Claims

ABSTRACT OF THE DISCLOSURE

A new copper compound, copper ketenide, is disclosed, useful as a complexing agent to provide complexes, particularly with metal halides, useful as catalysts for the oxidation of hydrocarbons, particularly the oxidation of ethylene and propylene to ethylene oxide and propylene oxide respectively. Copper ketenide may be prepared by reaction of a copper compound with ketone, which ketene may be preformed or formed in the reacting medium. The reaction may be carried out chemically or electrochemically.

---

This invention relates to a new copper compound, namely copper ketenide, copper ketenide-containing materials, to methods of making such compound and materials, to catalysts derived from such compounds and materials, and to hydrocarbon oxidation processes using such catalysts.

The copper ketenide according to the invention is useful as a complexing material for providing complexes having a catalytic activity in the oxidation of hydrocarbons, and is characterized by the general empirical formula $Cu_2C_2O$. In the said compound at least some of the copper atoms are linked by copper-copper bonds in a manner analogous to that of silver ketenide, described and claimed in our patent application No. 21,529.

Copper ketenide and copper ketenide-containing materials in general are characterized by showing one or more pronounced infra-red absorbtion maxima in the range 1920 to 2050 cm.$^{-1}$. A further characteristic is that copper ketenide and copper ketenide-containing materials react with dry hydrogen chloride in carbon tetrachloride to produce ketene, which may react with the hydrogen chloride present to give acetyl chloride, which may be detected by gas chromatography or other known processes. Thus one or both of the said characterizing features may be used to distinguish copper ketenide or copper ketenide-containing materials according to the invention from other copper-containing materials.

The term "copper ketenide-containing materials" includes complexes of copper ketenide with electron-donor molecules, for example water whereby hydrates are formed, ethers or tertiary amines, for example trimethylamine, triethylamine, tri-isobutylamine, N-methylpiperidine, N-methylmorpholine, diazabicyclo-octane, quinoline, isoquinoline, N,N-dimethyl aniline, 2,3-dimethyl quinoline, 2,6-dimethyl quinoline, N,N-dimethyl-o-toluidine, N-methyl pyrrolidine, 2-methyl quinoline, 5-methyl quinoline, α-picoline, β-picoline, γ-picoline and pyridine. The term also includes complexes with metal salts, including in particular copper salts. Such copper salts include in particular copper salts of inorganic acids, for instance copper halides, particularly cuprous chloride, bromide and iodide, and copper salts of organic acids, particularly cuprous formate and cuprous acetate. The term also includes a metal ketenide or ketenide-containing material wherein the said metal content comprises copper and silver.

One method of preparing copper ketenide, according to the invention, comprises reacting a solution of a cuprous compound with ketene. The solution is preferably a solution of an organic solvent substantially inert to ketene e.g. acetonitrile. The ketene may be preformed ketene gas, or ketene generated in situ. In the latter procedure the ketene may react in the nascent state, and may thus not be detectable under the reaction conditions. The cuprous compound used for the reaction may be a preformed cuprous compound, or it may be derived from a cupric compound which is reacted under conditions whereby the cuprous state of copper is produced.

A further method of preparing copper ketenide according to the invention is an electrochemical method using copper as the anode in an electrically-conducting liquid medium which is substantially non-reactive to ketene, whereby cuprous ions are generated at the anode surface and react with ketene, either preformed or generated in situ.

In systems wherein ketene is produced in situ, ketene may be generated in a chemical method according to the invention by heating acetic anhydride strongly. However it is preferred that the copper ketenide or copper ketenide-containing material is produced at a lower temperature, for instance at room temperature (20° C.) by the use as a ketene-generating system of acetic anhydride and a tertiary amine, as hereinafter described. Instead of acetic anhydride and tertiary amine, the copper compound may be reacted with a system comprising acetic anhydride and a dipolar aprotic solvent, for example dimethylformamide, dimethylacetamide or dimethylsulphoxide, preferably in the presence of a source of carboxylate ions, for example potassium acetate. Thus the total reaction mixture comprises the copper compound and the ketene-generating system.

Cuprous compounds which may be used to produce copper ketenide or copper ketenide-containing materials according to the invention may be cuprous salts, e.g. an inorganic cuprous salt, preferably a cuprous halide, particularly cuprous chloride, bromide, or iodide, or it may be a cuprous salt of an organic or inorganic acid, for instance cuprous formate and cuprous acetate, or cuprous nitrate. However the reaction may proceed expeditiously with some cupric compounds, for example cupric acetylacetonate and cupric acetate methanolate, and also in the presence of copper metal which promotes formation of the cuprous state.

When a ketene-generating system is used as hereinbefore described, it is preferred that the use of a tertiary amine which strongly stabilizes cupric ions, is avoided. Thus pyridine should not be present in proportions which substantially inhibit the reaction. A trialkylamine, particularly triethylamine, is a particularly suitable tertiary amine for use in such systems according to the invention.

The reaction of a cuprous compound with ketene either externally produced or produced in situ, is promoted by the presence of a compound which stabilizes the cuprous state in the reacting mixture. Examples of such promotors include organic nitriles, particularly acetonitrile.

Reaction of a copper salt with ketene as hereinbefore described may result in a copper ketenide complex reaction product containing the copper salt used as starting material. Thus the use of a cuprous halide starting material may result in a product which is substantially a complex of copper ketenide with cuprous halide. Such complexes, preferably with cuprous halide, for example cuprous chloride, are particularly useful in providing catalytically active material for the air-oxidation of hydrocarbons, for instance $C_2$–$C_{12}$ unsaturated hydrocarbons, particularly ethylene, propylene and butylenes, and also aromatic hydrocarbons, primary and secondary alcohols, e.g. methanol and isopropanol, oxo alcohols and allyl alcohols.

To produce such catalysts, the copper ketenide-containing materials as hereinbefore described may be subjected to a heat-treatment at a temperature in the range 150° to 250° C. for a period of time for example from 1 minute to 1 hour. The catalysts are preferably supported catalysts, being incorporated on a carrier material, e.g. alumina and/or silica, glass fibres, metal powder, metal gauze or wire, particularly copper gauze and copper wire. Thus the copper ketenide-containing material is deposited or generated on the carrier and the supported material subjected to the said heat-treatment, preferably in the presence of air, and more particularly in the presence also of the hydrocarbon to be oxidized.

In an electrolytic method of obtaining copper ketenide according to the invention, a copper anode, which may be for instance a copper bar, strip, or gauze, is inserted in a non-aqueous electrically-conducting liquid medium which is substantially inert to ketene, and cuprous ions are generated at the anode by passing an appropriate electrical current through the electrolytic system, and the cuprous ions thus produced reacted with ketene. The ketene may be preformed ketene gas, or may be generated in situ in the electrically-conducting liquid medium.

Electrically-conducting liquid media which are substantially inert to ketene may comprise for instance an alkyl ammonium salt in acetic anhydride, e.g. triethylammonium salt in acetic anhydride. Electrically-conducting systems which generate ketene in situ may comprise for example a solution of a tertiary amine, preferably a trialkylamine, particularly triethylamine, in acetic anhydride, preferably with a trace of acetic acid or trifluoroacetic acid.

The following examples of the preparation of copper ketenide-containing material are provided.

EXAMPLE 1

60 mls. of acetic anhydride were added to a solution of 4 g. of cuprous chloride in 100 mls. of dry acetonitrile at 20° C. under argon. 30 mls. of triethylamine were added to the stirred mixture. A crimson gel-like precipitate formed within 30 seconds. The reaction mixture was stirred for five minutes and then filtered under dry argon. The copper ketenide in the filter was washed twice with 50 mls. of acetonitrile and then with oxygen-free absolute ethanol until the washings were no longer coloured. Residual solvent was removed in a 0.5 mm. Hg vacuum oven at 30°. The infra-red spectrum of the resulting red-purple copper ketenide material showed a single intense absorption peak at 2030 cm.$^{-1}$ having a slight shoulder at 1975 cm.$^{-1}$. Analysis of the material gave the following result: Cu, 65.8; C, 14.1; H, 1.2; N, 0.54; Cl, 2.0; O (by difference), 18.4%, by weight. This analysis is consistent with a material of formula $Cu_2C_2O.H_2O$ associated with trace amounts of triethylamine and cuprous chloride.

EXAMPLE 2

The general procedure of Example 1 was followed, except that no acetonitrile was present in the reaction mixture, the cuprous chloride being dissolved to a limited extent in the liquid reaction medium. A crimson colour rapidly developed. After reaction for 24 hours, a black deposit was obtained consisting substantially of copper ketenide associated with copper chloride. Analysis of the said material gave the following results: Cu, 62.7; C, 14.95; H, 2.00; Cy, 7.4; N, 1.1; O (by difference), 11.85%. This analysis is consistent with a formula $$Cu_2C_2O.H_2O(N.Et_3)_{0.2}(CuCl)_{0.56}$$

EXAMPLE 3

An excess of ketene gas was passed into a 5% by weight solution of cuprous trifluoroacetate in acetonitrile at 20° C. A precipitate of copper ketenide was formed in 62% yield. Analysis of the said material gave the following results: C, 14.4; H, 0.2; N, 0.15; Cu, 74.9; O (by difference) 10.35%.

EXAMPLE 4

The general procedure of Example 3 was followed except that an equivalent proportion of cuprous nitrate was used instead of cuprous trifluoroacetate. The product was similar in composition and properties to that obtained in Example 3.

EXAMPLE 5

Ketene gas was passed into a saturated solution of cuprous formate in acetonitrile at 20° C. A red complex containing copper ketenide was formed, which on standing darkened and evolved ethylene and CO.

The following example is provided of the use of cupric compounds as a starting material.

EXAMPLE 6

A mixture of cupric acetylacetonate (10 g.) acetic anhydride (150 ml.) and triethylamine (30 ml.) was heated under reflux for 20 minutes to give a black material. The solution was filtered hot to give 3.01 g. of a black solid which was washed with acetic anhydride and acetone. The resulting ketenide-containing material was further washed with a 1:1 mixture of concentrated aqueous ammonia (sp. gr. 0.880) and water, then with acetic acid, and with water, methanol and ether. The infra-red spectrum of this black material showed absorption maxima at 1946 and 2010 cm.$^{-1}$. Analysis gave the following results: Copper, 63.6; carbon, 15.1; hydrogen, 1.2; nitrogen, 0.50; oxygen (by difference), 19.6%.

EXAMPLE 7

The general procedure of Example 6 was followed except that an equivalent proportion of cupric acetate methanolate  was used instead of cupric acetylacetonate. The brown product had an infra-red absorption spectrum consistent with a ketenide structure.

The following example is provided of an electrochemical method of producing copper ketenide.

EXAMPLE 8

A copper anode was inserted in an electrolyte formed by mixing 70 parts of acetic anhydride, 30 parts of triethylamine, 5 parts of trifluoroacetic acid and 100 parts of acetonitrile, all parts being by volume, and an electrical current passed at 25° C. to provide an anode current density of 0.1 ma./cm.$^3$. A red adherent layer of copper ketenide was formed on the anode. The copper ketenide thus formed had an infra-red absorption spectra similar to that obtained in Example 1.

The following examples of the use of copper ketenide-containing material in the air oxidation of propylene are provided:

EXAMPLE 9

0.1 g. of the ketenide material prepared according to Example 1 was suspended on glass wool in a reactor tube and a 1:7 propylene/air mixture passed through the tube at atmospheric pressure. The temperature was slowly raised. Propylene oxide and acetone were detected in the effluent gases (with traces of $CO_2$ and $H_2O$) at 200° C. in a ratio of 1:20. The amount of these products formed indicate a high yield with 1% conversion of propylene. On further heating of the catalyst to 260° the rate of propylene oxidation increased for a brief period.

EXAMPLE 10

A propylene/air mixture was oxidized using a copper ketenide-containing material prepared according to Example 2, under the conditions described in Example 9. A propylene oxide yield of 80% was obtained at 220° C. at a conversion of 1%.

The following example is provided of the use of copper ketenide-containing materials in the air oxidation of ethylene.

EXAMPLE 11

4.2 g. of a copper ketenide complex prepared as in Example 2 was suspended in 50 mls. water and heated at 80° C. for 90 minutes. The suspension was filtered and the solid in the filter washed with water and dried to give a red solid. The infra-red spectrum absorption at ca. 2000 cm.$^{-1}$, indicating that the product contained ketenide groups. The material also contained chloride. The product showed a magnetic susceptibility which was field dependent. Thus at field strengths of 5.0, 6.6, and 8.2 kilogauss, $\alpha_g^{20°}$ was 11.1, 9.2 and 7.9 cgsu $\times 10^{-6}$ respectively.

0.5 g. of the red solid (ca. 0.5 g.) was suspended on 12 g. alkali-washed glass Fenske helices in a reactor tube. A 1:4 ethylene/air mixture was passed through the tube at atmospheric pressure. The temperature was slowly raised to 230° C. and ethylene oxide and acetaldehyde were produced in yields of 15% and 6% respectively, corresponding to a conversion of 3%.

Mixed ketenides of copper and silver may be prepared by treating copper ketenide with a solution of a silver salt. The silver atoms migrate into the copper layer of the copper ketenide, and copper nitrate is formed by an exchange mechanism. The proportion of silver thus introduced into the copper ketenide structure may be varied as desired according to the proportion of silver salt used and the reaction time, temperature, and medium.

The following example is provided of the formation of a mixed copper-silver ketenide.

EXAMPLE 12

1.67 g. of copper ketenide, prepared as in Example 3, was treated with a solution of 0.34 g. of silver nitrate in 5 ml. acetonitrile under argon at 50° C. The mixture was stirred for 65 minutes until silver was no longer present in the solution. The resulting suspension was cooled to 20° C. and filtered. The solid in the filter was washed with acetonitrile and freed from solvent in air. 1.75 g. of a dark-red product was obtained, the analysis of which was consistent with a mixed ketenide complex of silver and copper, associated with a trace of water. Found: C, 12.5; H, 0.6; Cu, 62.5; Ag, 11.1; O (by difference) 13.3% by weight.

The following example is provided of the formation of a mixed copper-silver ketenide and the use thereof in the oxidation of ethylene.

EXAMPLE 13

1.0 g. of copper ketenide, prepared as in Example 3, was suspended in 3 ml. of water, and 15 ml. of a saturated aqueous solution of silver nitrate at 20° C. was added to the said suspension and the mixture gently stirred for 25 minutes and filtered. The solid residue was washed consecutively with water, acetone and n-pentane, and dried to provide 2.55 g. of dried material. The dry material contained copper, silver and ketenide groups as indicated by broad infra-red absorption peaks at ca. 2000 cm.$^{-1}$.

The material thus obtained was supported on alkali-washed glass Fenske helices and heated to 230° C. for 1 hour in a 4/1 air/ethylene mixture, whereby ethylene oxide was produced.

As described, a test which may be used to identify copper ketenide and copper ketenide-containing materials is by their reaction with hydrogen chloride to provide ketene. Thus the passage of dry hydrogen chloride gas into a suspension of 2 grm. of copper ketenide as prepared in Example 3, in 50 mls. of carbon tetrachloride at 20° C., provided ketene which was identified in the supernatant liquor by gas chromatography and its infra-red spectrum, together with some acetyl chloride more of which tended to be formed when an excess of hydrogen chloride was used. The reaction with hydrogen chloride may also conveniently be conducted in ethyl alcohol as a medium when ketene is trapped as ethyl acetate. The foregoing procedures distinguish copper ketenide materials from the known and sometimes superficially similar acetylide and acetylene complexes of copper which produce an acetylene under these conditions.

Copper ketenides and complexes thereof which do not contain major quantities of metals other than copper, for example the materials obtained as in Examples 1 to 8, may also be characterised by their infra-red absorption spectra which show an absorption peak over the range 470–490 cm.$^{-1}$, and normablly at ca. 480 cm.$^{-1}$ ($\nu$ Cu-C) and also an absorption peak attributable to the ketenide group within the range 650–690 cm.$^{-1}$ and normally at ca. 665 cm.$^{-1}$.

What is claimed is:
1. Copper ketenide.
2. A complex of copper ketenide and a copper halide.
3. A complex of copper ketenide and cuprous chloride, bromide or iodide.
4. A copper ketenide containing material which is a complex of a copper ketenide and a copper salt of an organic acid selected from the group consisting of cuprous formate, cuprous acetate and cuprous trifluoroacetate.
5. A copper ketenide containing material which is a complex of a copper ketenide and cuprous nitrate.
6. A copper ketenide containing material which is a complex of a copper ketenide and organic cupric compounds selected from the group consisting of cupric acetylacetonate and cupric acetate methanolate.
7. A method of preparing copper ketenide material which comprises, reacting a solution of a copper halide selected from the group consisting of chloride, bromide and iodide with ketene.
8. A method of preparing copper ketenide material which comprises, reacting a solution of a copper salt of an organic acid selected from the group consisting of cuprous formate, cuprous acetate and cuprous trifluoroacetate with ketene.
9. A method of preparing copper ketenide which comprises reacting a solution of cuprous nitrate with ketene.
10. A method of preparing copper ketenide material which comprises, reacting a solution of an organic cupric compound selected from the group consisting of cupric acetylacetonate and cupric acetate methanolate with ketene.
11. A method according to claim 8, which comprises reacting said solution with ketene generated in the reacting medium.
12. A method according to claim 11, which comprises reacting the copper salt with acetic anhydride and a tertiary amine.
13. A method according to claim 12, wherein the tertiary amine is a trialkylamine.
14. A method according to claim 13, wherein the trialkylamine is a triethylamine.
15. A method according to claim 12, wherein the reaction mixture contains an organic nitrile.
16. A method according to claim 15, wherein the organic nitrile is acetonitrile.
17. A method according to claim 9, which comprises reacting said solution with ketene generated in the reacting medium.
18. A method according to claim 17, which comprises reacting the cuprous nitrate with acetic anhydride and a tertiary amine.
19. A method according to claim 18, wherein the tertiary amine is a trialkylamine.
20. A method according to claim 19, wherein the trialkylamine is a triethylamine.
21. A method according to claim 18, wherein the reaction mixture contains an organic nitrile.
22. A method according to claim 21, wherein the organic nitrile is acetonitrile.
23. A method according to claim 10, which comprises reacting said solution with ketene generated in the reacting medium.

24. A method according to claim 10, wherein a cuprous compound is formed from the cupric compound under the reaction conditions.

25. A method according to claim 23, wherein the cuprous compound is formed from the cupric compound under the reaction conditions.

26. A method according to claim 10, which comprises reacting the cupric compound with acetic anhydride and a tertiary amine.

27. A method according to claim 26, wherein the tertiary amine is a trialkylamine.

28. A method according to claim 27, wherein the trialkylamine is a triethylamine.

29. A method according to claim 26, wherein the reaction mixture contains an organic nitrile.

30. A method according to claim 29, wherein the organic nitrile is acetonitrile.

31. A method according to claim 26, wherein the cuprous compounds are formed from a cupric compound under the reaction conditions.

32. A method according to claim 7, which comprises reacting said solution with ketene generated in the reacting medium.

33. A method according to claim 7, wherein the cuprous compounds are formed from a cupric compound under the reaction conditions.

34. A method according to claim 32, wherein the cuprous compounds are formed from a cupric compound under the reaction conditions.

35. A method according to claim 7, which comprises reacting the cupric compound with acetic anhydride and a tertiary amine.

36. A method according to claim 35, wherein the tertiary amine is a trialkylamine.

37. A method according to claim 36, wherein the trialkylamine is a triethylamine.

38. A method according to claim 35, wherein the reaction mixture contains an organic nitrile.

39. A method according to claim 38, wherein the organic nitrile is acetonitrile.

40. A method according to claim 35, wherein the cuprous compounds are formed from a cupric compound under the reaction conditions.

References Cited
UNITED STATES PATENTS

| | | | |
|---|---|---|---|
| 2,924,614 | 2/1960 | Reuter | 260—429.3 |
| 2,483,440 | 10/1949 | Shaw et al. | 260—430 |
| 2,474,869 | 7/1949 | Shaw et al. | 260—430 |

OTHER REFERENCES

Chemical Abstracts, vol. 56, 12920d (1962).

HELEN M. S. SNEED, Primary Examiner

U.S. Cl. X.R.

204—59; 252—431; 260—348, 348.5, 430